(12) United States Patent
Silverstein et al.

(10) Patent No.: US 7,499,081 B2
(45) Date of Patent: Mar. 3, 2009

(54) DIGITAL VIDEO IMAGING DEVICES AND METHODS OF PROCESSING IMAGE DATA OF DIFFERENT MOMENTS IN TIME

(75) Inventors: D. Amnon Silverstein, Mountain View, CA (US); Eric Setton, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 10/427,597

(22) Filed: Apr. 30, 2003

(65) Prior Publication Data

US 2004/0218062 A1 Nov. 4, 2004

(51) Int. Cl.
*H04N 5/228* (2006.01)

(52) U.S. Cl. .................. 348/222.1; 348/362; 348/208.1

(58) Field of Classification Search ............ 348/207.99, 348/221.1, 362, 208.1, 262
See application file for complete search history.

(56) References Cited

U.S. PATENT DOCUMENTS

| | | | |
|---|---|---|---|
| 4,652,909 A | | 3/1987 | Glenn |
| 5,233,411 A | | 8/1993 | Nam et al. |
| 5,262,871 A | | 11/1993 | Wilder et al. |
| 6,122,017 A | * | 9/2000 | Taubman .................... 348/620 |
| 6,151,079 A | | 11/2000 | Nagata et al. |
| 6,198,505 B1 | | 3/2001 | Turner et al. |
| 6,278,490 B1 | * | 8/2001 | Fukuda et al. .............. 348/362 |
| 6,300,985 B1 | | 10/2001 | Lowe et al. |
| 6,356,587 B1 | | 3/2002 | Choi |
| 6,930,718 B2 | * | 8/2005 | Parulski et al. .......... 348/333.11 |
| 7,050,094 B2 | * | 5/2006 | Krymski ................... 348/221.1 |
| 7,119,837 B2 | * | 10/2006 | Soupliotis et al. ....... 348/208.99 |
| 7,233,350 B2 | * | 6/2007 | Tay ......................... 348/231.99 |
| 2004/0036782 A1 | * | 2/2004 | Knapp ......................... 348/239 |
| 2004/0252202 A1 | * | 12/2004 | Silverstein et al. ........ 348/222.1 |

OTHER PUBLICATIONS

"The World's first Full-Color Image Sensor" http://www.foveon/X3_tech.html; Apr. 11, 2003; 1 p.
"Why X3 is Better" http://www.foveon/X3_better.html; Apr. 11, 2003; 2 pps.
"Why X3 is Sharper" http://www.foveon/X3_sharper.html; Apr. 11, 2003; 2 pps.

(Continued)

*Primary Examiner*—Lin Ye
*Assistant Examiner*—Gevell Selby

(57) ABSTRACT

Digital video image data processing methods, digital video imaging devices, and articles of manufacture are described. According to one aspect, a digital video image data processing method includes providing a digital video imaging device configured to obtain image data, reading image data for a plurality of rolling frames from an image sensor of the digital video imaging device, wherein the reading for an individual one of the rolling frames comprises reading a plurality of different portions of the image sensor at a plurality of respective different moments in time, and forming a plurality of desired frames comprising image data at a plurality of respective common moments in time, wherein the forming comprises forming an individual one of the desired frames using image data from a plurality of the rolling frames.

39 Claims, 4 Drawing Sheets

OTHER PUBLICATIONS

"Variable Pixel Size" http://www.foveon/X3_vps.html; Apr. 11, 2003; 2 pps.

"A Simpler, More Flexible Approach to Windowing Applications"; http://www.foveon/X3_windowing.html; Apr. 11, 2003; 2 pps.

* cited by examiner

DIGITAL VIDEO IMAGING DEVICES AND METHODS OF PROCESSING IMAGE DATA OF DIFFERENT MOMENTS IN TIME

FIELD OF THE INVENTION

Aspects of the invention relate to digital video image data processing methods, digital video imaging devices, and articles of manufacture.

BACKGROUND OF THE INVENTION

Digital imaging devices are becoming increasingly popular for still and video imaging operations. Numerous advancements for these devices have been made including increased resolutions and improved processing speeds. These digital cameras are used in an ever-increasing number of applications, and the popularity of these devices is expected to increase as the device capabilities increase and costs are reduced.

Some digital camera arrangements use a digital image sensor for exposing images and generating digital image data. For example, CMOS image sensors are available and include a plurality of pixel elements which may be read to generate digital image information. In one implementation, voltages of pixel locations of the CMOS image sensor may be read during sensing or image data generation operations. During exposure operations, received photos remove electrons from semi conductive wells of the image sensor corresponding to the pixel locations. The number of electrons remaining after exposure provide the sensed voltages which correspond to intensity information (i.e., pixel brightness) at the pixel locations. The voltage values may be provided to an analog-to-digital converter for conversion to digital information providing digital image data. The pixel locations may be reset following read operations. In one embodiment, the reset operations include recharging the semi conductive wells of the pixel locations. Other types of image sensors are available.

Digital imaging devices may use a hardware shutter to control exposure operations. These devices include the necessary actuators and other physical structures to implement mechanical motion of physical shutter operations resulting in devices of increased complexity. As described herein, improved methods and apparatus are described for obtaining digital image data in digital video applications.

SUMMARY OF THE INVENTION

Aspects of the invention relate to digital video image data processing methods, digital video imaging devices, and articles of manufacture.

According to one aspect, a digital video image data processing method includes providing a digital video imaging device configured to obtain image data, and reading image data for a plurality of rolling frames from an image sensor of the digital video imaging device. The reading for an individual one of the rolling frames comprises reading a plurality of different portions of the image sensor at a plurality of respective different moments in time, and forming a plurality of desired frames comprising image data at a plurality of respective common moments in time. The forming comprises forming an individual one of the desired frames using image data from a plurality of the rolling frames.

According to another embodiment of the invention, a digital video imaging device comprises an image sensor configured to generate digital video image data responsive to received light of a subject image and wherein the image sensor comprises a plurality of independently accessible portions. The device further comprises processing circuitry coupled with the image sensor and the processing circuitry is configured to read image data from different portions of the image sensor for the subject image at a plurality of different moments in time for a rolling frame. The processing circuitry is also configured to utilize image data from a given portion of the image sensor at a plurality of different moments in time to create a respective portion of a desired frame to be outputted and corresponding to the subject image.

Other aspects of the invention are disclosed herein as is apparent from the following description and figures.

DETAILED DESCRIPTION OF THE INVENTION

Figure 1:
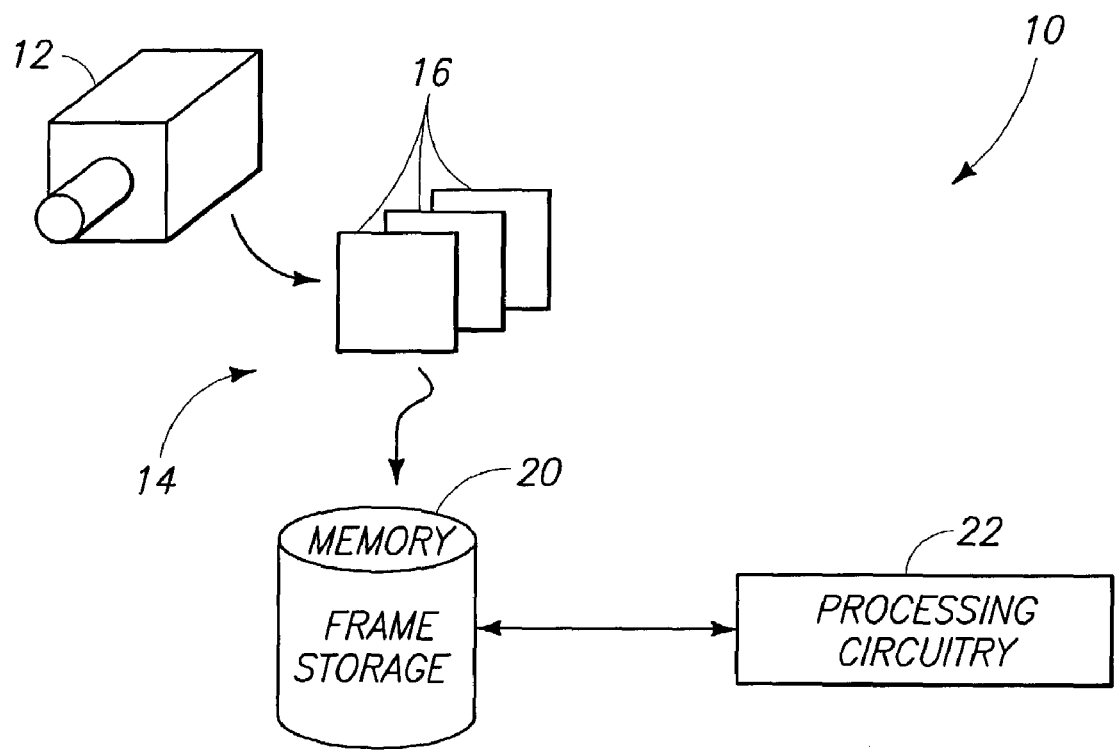
FIG. 1 is an illustrative representation of a digital video imaging system according to one embodiment.

Referring to FIG. 1, a digital video imaging system 10 according to one exemplary embodiment is illustrated. Imaging system 10 includes an imaging device 12, such as a digital video camera, configured to obtain image data 14. Image data 14 includes a plurality of frame images or frames 16 obtained during imaging operations. Individual frames 16 comprise a raster of digital data comprising, for example, luminance, chrominance or other digital information, for a plurality of pixels in a raster. As described further below, imaging device 12 is configured to utilize an electronic rolling shutter in one embodiment and image data 14 may be referred to as rolling image data and frames 16 may be referred to as rolling frames.

The illustrated configuration of system 10 further includes a memory 20 and processing circuitry 22. Memory 20 is configured to receive and store rolling image data 14 of rolling frames 16.

Processing circuitry 22 is arranged to process image data 14. Exemplary processing operations of processing circuitry 22 are described in detail below. Processing circuitry 22 may be arranged to execute programming instructions (e.g., software, hardware, etc.) to process image data 14. Accordingly, in such arrangements, processing circuitry 22 may be implemented as a microprocessor of a notebook computer, personal computer, workstation or other digital processing arrangement. Processing circuitry 22 may also comprise a field programmable gate array or any other hardware and/or software configuration capable of processing digital data of the obtained image data 14 as described herein.

Memory 20 and processing circuitry 22 are depicted externally of imaging device 12 and separate in the exemplary configuration. In other possible embodiments, memory 20 and processing circuitry 22 may be embodied within a single device, such as a computer or workstation. In another possible embodiment, memory 20 and/or processing circuitry 22 are arranged within imaging device 12. Other configurations of imaging system 10 are possible.

Figure 2:
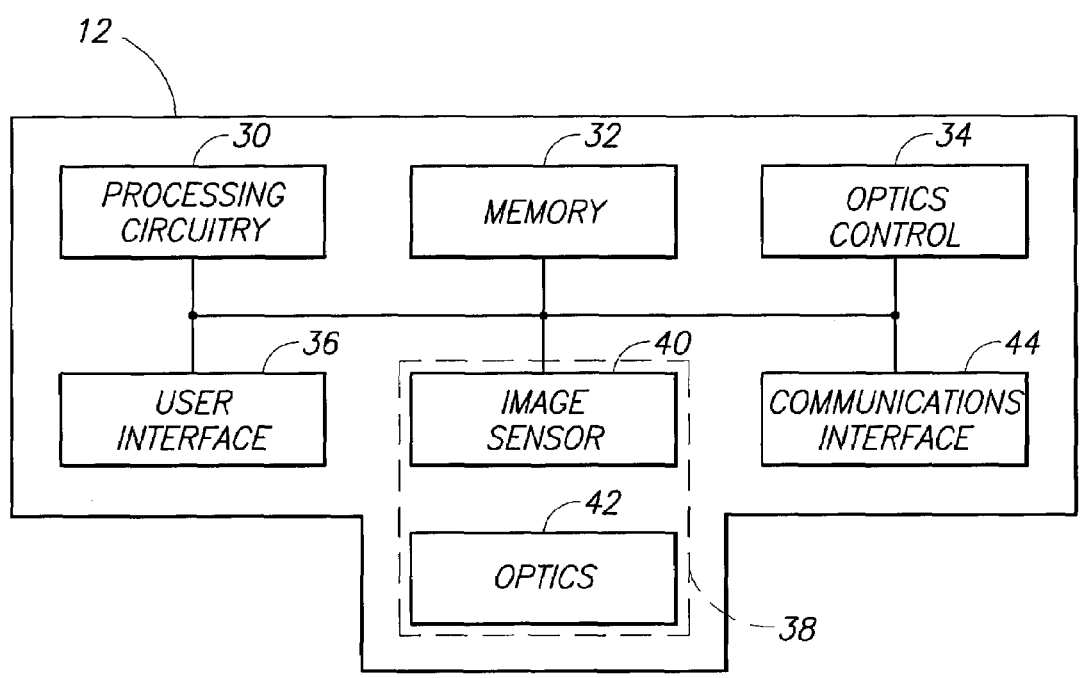
FIG. 2 is a functional block diagram of a digital video imaging device according to one embodiment.

Referring to FIG. 2, an exemplary embodiment of an imaging device 12 is shown. As shown in FIG. 2, the exemplary imaging device 12 includes processing circuitry 30, a memory 32, an optics control 34, a user interface 36, an imaging system 38 (including an image sensor 40 and optics 42 in the exemplary embodiment) and a communications interface 44. The illustrated exemplary imaging system 38 is configured to provide raw digital image data 14 in a plurality of rolling frames 16. The raw digital image data comprises digital data corresponding to a plurality of pixels of raw images formed by image sensor 40.

Processing circuitry 30 is implemented as a microcontroller in an exemplary configuration. Processing circuitry 30 is configured to execute instructions to control operations of device 12 and the generation of image data. Alternatively, processing circuitry 30 may be completely implemented in hardware. Additionally, processing circuitry 30 may control operations of user interface 36 including controlling the display of information using user interface 36 and the processing of inputted data received via user interface 36.

Memory 32 is arranged to store digital information and instructions. Memory 32 may include a buffer configured to receive raw raster image data 14 from image sensor 40 and to store such data for processing. Memory 20 and processing circuitry 22 of FIG. 1 (or operations thereof) may be implemented using memory 32 and processing circuitry 30 of FIG. 2 (or vice versa) in exemplary embodiments.

As described, memories 20, 32 are configured to store electronic data, programming such as executable instructions (e.g., software and/or firmware), and/or other digital information and may include processor-usable media. Processor-usable media includes any article of manufacture which can contain, store, or maintain programming for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a magnetic computer diskette (e.g., floppy diskette, zip disk, hard disk), random access memory, read only memory, flash memory, erasable programmable read only memory, compact disk, or other configurations capable of storing programming, data, or other digital information.

Optics control 34 controls focus operations, zoom operations, and/or other desired operations of optics 42. In one embodiment, optics control 34 includes a plurality of motors which are controlled by processing circuitry 30.

Image sensor 40 is configured to generate image data 14 comprising frames 16 responsive to received light of a subject image. In exemplary configurations, image sensor 40 includes a raster of pixels or pixel locations provided in a plurality of rows and columns. Image sensor 40 may additionally include A/D converters to convert received analog signals into digital image data.

In one embodiment, image sensor 40 is configured to permit independent reading of image data 14 of one or more pixel of the sensor separate from other pixels of the sensor. For example, at a given time instant, any desired or chosen portions or subsets of pixels may be read.

In one embodiment, image sensor 40 is implemented using a Foveon X3 image sensor available from Foveon, Inc. The Foveon X3 image sensor comprises a full color sensor which provides full color (e.g., RGB) at a plurality of pixel locations without interpolation. In addition, color information regarding a single color or a plurality of colors may be read from a plurality of respective planes of the Foveon X3 image sensor at a given moment in time. The Foveon X3 image sensor permits independent querying of individual pixels or portions of pixels. Further, an individual pixel may include color information for one or more colors and the individual colors may additionally be independently queried or alternately queried with other color information.

Communications interface 44 is configured to implement communication of image and other data externally of device 12 (e.g., with memory 20 or circuitry 22). Communications interface 44 may implement wired and/or wireless communications in exemplary configurations.

Figure 3:
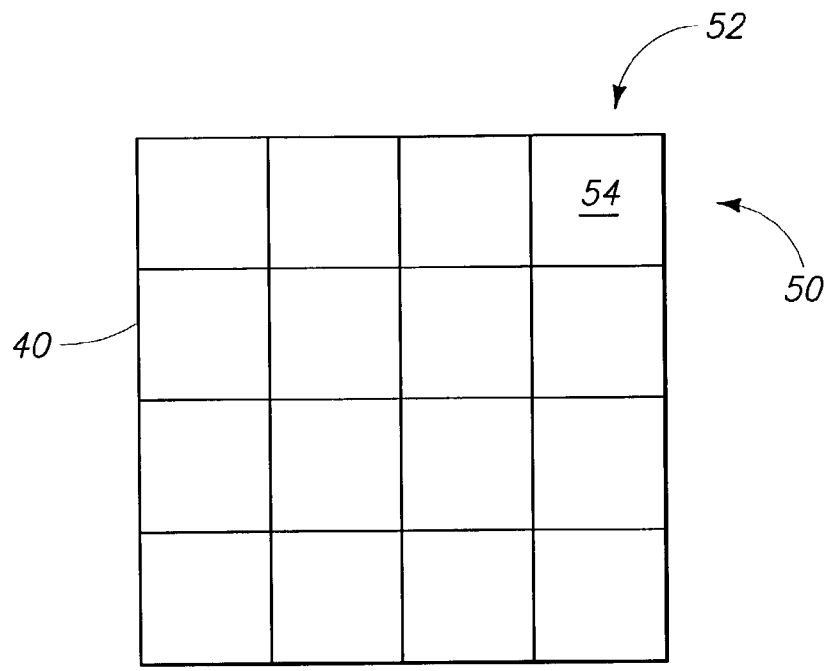
FIG. 3 is an illustrative representation of an image sensor of the imaging device according to one embodiment.

Referring to FIG. 3, exemplary operations of acquiring or generating image data using image sensor 40 are described. The exemplary acquisition and processing of image data may be performed using processing circuitry 22 and/or 30 depending upon the configuration or application of the system 10. For illustrative purposes herein, processing with respect to processing circuitry 30 is described.

FIG. 3 illustrates a plurality of rows 50 and columns 52 of pixels or pixel locations 54 of a sensor 40 (typical sensors 40 have millions of pixels). As mentioned previously, imaging device 12 may be arranged to implement electronic rolling shutter operations for capturing digital video rolling image data. Exemplary electronic rolling shutter operations include selectively reading and resetting independent portions (e.g., one or more pixel 54) of image sensor 40. In one embodiment, rows 50 of pixels 54 comprise groups which are sequentially and continuously read and reset to generate digital video image data without the use of a hardware shutter. Other embodiments are possible for reading and resetting portions of image sensor 50, including for example, reading columns 52 of pixels 54 or other portions of pixels 54. Embodiments described herein use an exemplary configuration wherein rows 50 of pixels 54 are sequentially read from top to bottom. Other ordering schemes may be utilized including right to left, left to right, bottom to top, or any other desired arbitrary scheme.

According to the described exemplary arrangement, the rows 50 of pixels 54 are sequentially read by processing circuitry 30 and the respective rolling image data is buffered in memory 32 or stored in memory 20, and/or other appropriate location. Following reading, the rows 50 of pixels 54 are sequentially reset by processing circuitry 30 for subsequent exposure. In one embodiment, processing circuitry 30 may count a delay period intermediate read and reset operations to minimize overexposure. For example, if a first row 50 is read, processing circuitry 30 may count a delay period before resetting the first row 50 to provide appropriate exposure of the first row 50 of pixels 54 read in the next subsequent read operation. The delay period may be referred to as an offset operation to reduce overall exposure and to compensate for bright light, for example.

Following reset operations, pixels 54 immediately begin to expose inasmuch as no hardware shutter is provided in one exemplary embodiment. By the time the final one (e.g., bottom) of the. rows 50 is read in one rolling frame 16, the first of the rows 50 (e.g., top) is ready for reading for the next rolling frame 16.

Figure 4:
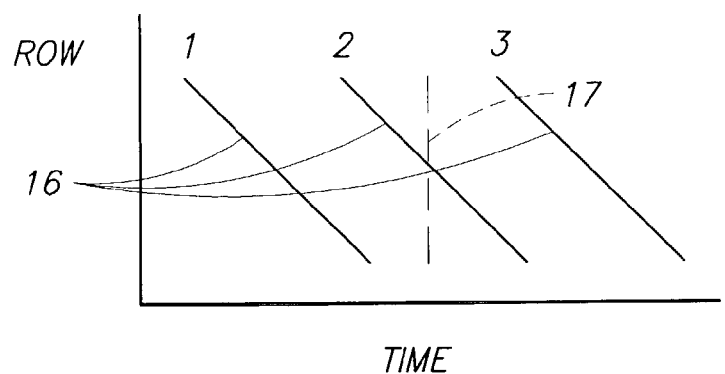
FIG. 4 is a graphical representation of exemplary image data acquisition and processing operations according to one embodiment.

Referring to FIG. 4, exemplary image data processing operations are described. As mentioned above, the exemplary processing is described with respect to circuitry 30 although processing circuitry 22 or other circuitry may be used in other embodiments.

FIG. 4 depicts a plurality of rolling frames 16 in a graph illustrating acquired rolling image data corresponding to rows 50 with respect to time. The graph shows temporal error introduced when frames 1 6 of image data are captured according to at least some aspects described herein with respect to proper depiction of the image data.

For example, individual rolling frames 16 are slanted with respect to time corresponding to the sequential reading of the rows 50 of pixels 54. In the illustrated example, the top row of image sensor 40 is read at a moment in time before subsequently read rows. Accordingly, the rolling frames 16 are slanted to show rows sequentially read from top to bottom as time progresses from left to right in one example. Following the reading of a last row (e.g., bottom) of a first rolling frame 16, the first row (e.g., top) of the next rolling frame 16 is read. As shown, different portions (e.g., rows) of the image sensor 40 are read at different moments in time.

The illustrated rolling image data acquisition depicts a drawback of acquiring the image data (e.g., portions acquired at different moments in time) in a method different than that used to depict the image data (e.g., all portions depicted at respective common moments in time). More specifically, as individual rolling frames 16 are displayed, the top of the rolling frame 16 will be from a moment in time earlier than the bottom of the rolling frame 16. If the imaging device 12 is panned during data acquisition, objects within a subject image (e.g., the image providing light received within optics 42) may appear to lean towards the direction of motion of the imaging device 12. If the imaging device 12 is tilted during data acquisition, the objects of the subject image may be compressed or expanded. Put another way, when the rolling frames of image data are presented on a display screen with a different refresh pattern, objects of the subject image may sheer as the imaging device 12 pans, or compress or expand as the imaging device 12 tilts. The resultant output effect is scenes may appear "rubbery," or as if an earthquake were occurring. The effect may be objectionable for electronic rolling shutter implementations of relatively low frame rates (e.g., <24 fps).

In one embodiment, system 10 is arranged to remove artifacts by resampling rolling frames 16 in time. For example, system 10 translates image data of image data of rolling frames 16 into a plurality of respective desired frames 17 at desired instant moments in time in one arrangement (e.g., corresponding to the rows of image data of desired frame 17 being depicted vertically at an instant in time in the described example). The illustrated desired frame 17 is illustrated aligned at a moment in time corresponding to the center of one of the rolling frames 16. Although not shown, additional desired frames 17 are also provided corresponding to the individual rolling frames 16 to provide a framerate of desired frames 17 equaling a framerate of the rolling frames 16 in one embodiment.

One exemplary method for providing one of desired frames 17 includes interpolating using image data of a plurality of rolling frames 16. For simplicity, linear interpolation may be used. In other implementations, higher order interpolations (e.g., spline or polynomial interpolation) may be used to calculate image data of the desired frame 17 from additional rolling frames 16.

In one example of a linear interpolation method, a weighted average of image data of a plurality of rolling frames 16 which border the desired frame 17 may be used. For example, pixels of the top row of desired frame 17 may be determined using a 50%/50% average of respective pixels of the same row of image data in the second and third rolling frames 17. For the next (e.g., lower) row of desired frame 17, a larger percentage of the image data for the respective row of the second rolling frame 16 may be used compared with the image data for the respective row of the third rolling frame 16.

By the center row of the desired frame 17, the image data may be directly used from the respective row of the second rolling frame 16. For rows below the center of the desired frame 17, weighted averages of image data from respective rows of the first and second rolling frames 16 may be used.

The translated data may be referred to as desired data of the desired frames 17. The desired frames 17 illustrate image data for the pixels 54 of the image sensor 40 at respective common (e.g., instant) moments in time. The respective rolling image data may be aligned with the common or given moment in time of the respective desired frames 17 using interpolation in one exemplary embodiment. As described in the depicted example, rolling image data from a plurality of rolling frames 16 may be used to form the desired image data of a desired frame 17. In one exemplary embodiment, rolling image data from a given portion of image sensor 40 (e.g., a top row 50) at a plurality of different moments in time is used to create a respective portion (e.g., a top row) of the desired frame 17 at the desired moment in time.

The positioning of desired frames 17 may be varied with respect to rolling frames 16. For example, desired frames 17 may be aligned in time with beginnings (or other portions) of the rolling frames 16. If desired frame 17 of FIG. 4 is aligned with a beginning of the second rolling frame 16, then rolling image data from the first and second rolling frames 16 may be utilized to provide an entirety of the translation operations described herein for the respective desired frame 17. In one embodiment, rolling image data from the rolling frames 16 immediately adjacent in time (e.g., before and after) the desired frame 17 may be used to determine the desired image data for the desired frame 17. Data from frames other than the immediately adjacent rolling frames 16 may be used in other embodiments.

Provision of desired frames 17 removes jiggly artifacts which may result from the described electronic rolling shutter. Linear interpolation provides benefits of being relatively fast and straightforward computationally. According to the exemplary interpolation embodiment, no motion vectors are utilized and the methodology may be implemented using many different configurations of imaging device 12. Some motion blur may be introduced by the described method, however, it is not overly objectionable in initial tests inasmuch as the blurring is more severe at top and bottom edges.

According to additional aspects, motion data between rolling frames 16 may be used to assist with the translation operations. For example, motion vectors for the subject image may be determined by processing circuitry 30 and used to assist with translation operations, including for example, forming desired frames 17 by matching adjacent rolling frames 16 with forward and/or backward extrapolation of the motion.

In one implementation, motion data comprising a single dominant motion of an entire rolling frame 16 is determined. In another implementation, full flow fields are determined (e.g., using MPEG processing techniques) and motion data is determined for individual ones of the pixels.

For a given rolling frame 16, velocity information is determined for the entire frame or on an individual pixel basis corresponding to dominant motion or full flow field methodologies. A corresponding pixel is identified from an adjacent rolling frame 16 using the calculated velocity information and the elapsed time intermediate the rolling frames 16 being analyzed. The image data for the corresponding identified pixels of the rolling frames 16 may be interpolated and the interpolated image data may be positioned at an appropriate location within the desired frame 17 using the motion data. Blurring should not adversely impact results if a sufficient framerate of rolling frames 16 is utilized (e.g., 15-20 fps for typical configurations of device 12 and scenes).

Figure 5:
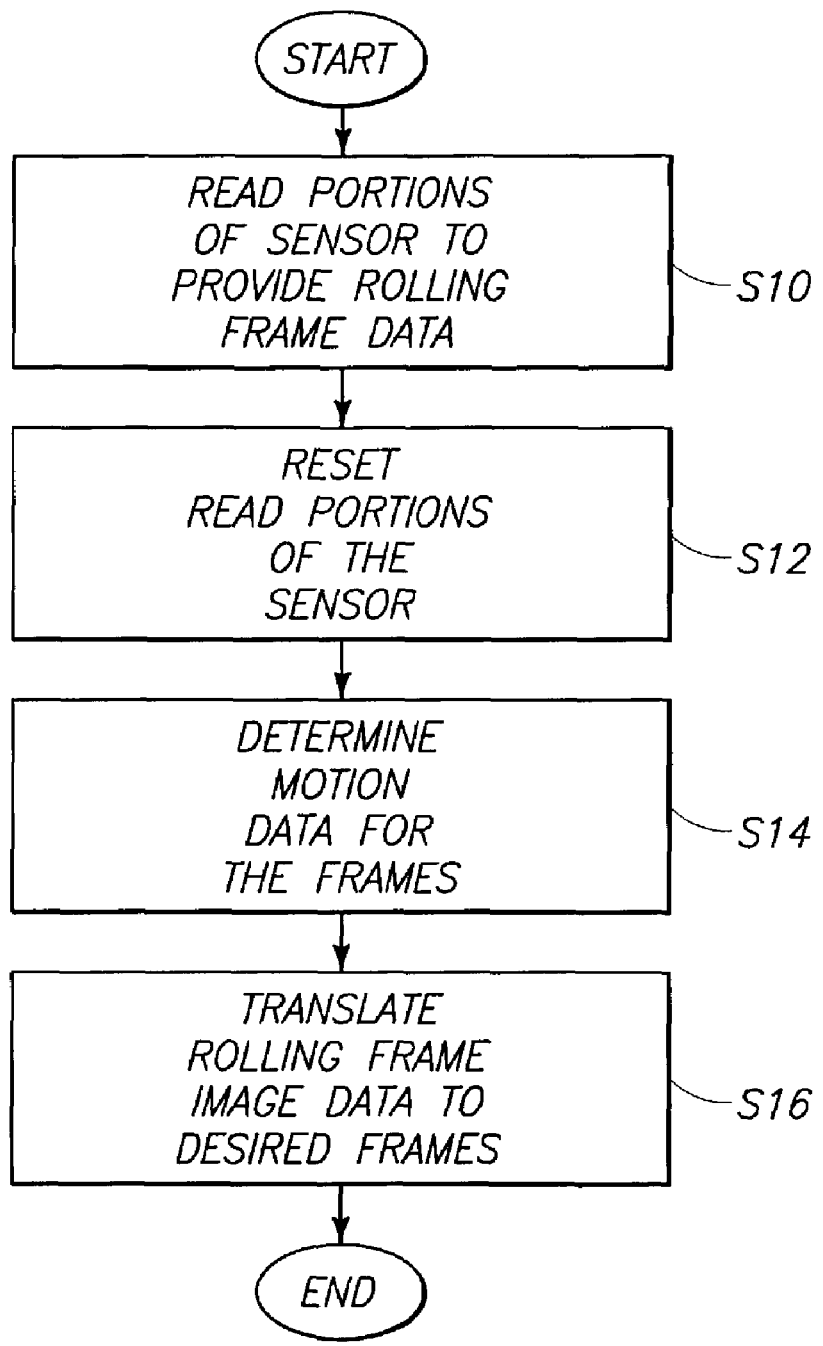
FIG. 5 is a flow chart of a method of processing image data according to one embodiment.

Referring to FIG. 5, an exemplary image data processing methodology performed by processing circuitry 22, 30 and/or other appropriate circuitry is illustrated. Other methods are possible including more, less or alternative steps.

Initially, at a step S10, the processing circuitry reads portions of the image sensor to obtain image data for the rolling frames.

At a step S12, the processing circuitry resets read portions of the image sensor. In one embodiment, the processing circuitry may count a delay or offset intermediate the reading and the resetting to avoid overexposure.

At a step S14, motion data is determined intermediate adjacent rolling frames.

At a step S16, the image data from the rolling frames is translated into the desired frames at respective moments in time. The desired frames may be outputted to generate output video of the subject image.

The protection sought is not to be limited to the disclosed embodiments, which are given by way of example only, but instead is to be limited only by the scope of the appended claims.

What is claimed is:

1. A digital video image data processing method comprising:
    reading image data for a plurality of rolling frames from an image sensor of a digital video imaging device, wherein the reading for an individual one of the rolling frames comprises reading a plurality of different portions of the image sensor at a plurality of respective different moments in time;
    forming a plurality of desired frames comprising image data at a plurality of respective common moments in time, wherein the forming comprises forming an individual one of the desired frames using image data from a plurality of the rolling frames; and
    wherein an entirety of the image data of an individual one of the desired frames corresponds to a single one of the common moments in time.

2. The method of claim 1, wherein the forming an individual one of the desired frames comprises interpolating the image data from the rolling frames.

3. The method of claim 2, wherein the interpolating comprises interpolating using the rolling frames immediately adjacent in time to the individual desired frame being formed.

4. The method of claim 2, wherein the interpolating comprises interpolating using a weighted average of the image data of the rolling frames.

5. The method of claim 1, wherein the forming comprises determining motion data intermediate the rolling frames, and translating the image data of at least one of the rolling frames using the motion data.

6. The method of claim 1, wherein the reading comprises sequentially reading a plurality of rows of the image sensor.

7. The method of claim 1, further comprising:
    counting a delay period at a plurality of moments in time after the reading of the respective portions, and
    resetting the portions of the image sensor after the respective countings of the delay period.

8. The method of claim 1, wherein the forming the desired frames comprises using the image data of respective ones of all of the rolling frames generated by the image sensor of the digital video imaging device.

9. The method of claim 1, wherein an entirety of the image data of one of the desired frames corresponds to image data of a scene at the respective common moment in time comprising a single moment in time.

10. A digital video imaging device comprising:
    an image sensor configured to generate digital video image data responsive to received light of a subject image and wherein the image sensor comprises a plurality of independently accessible portions;
    processing circuitry coupled with the image sensor, wherein the processing circuitry is configured to read image data from different portions of the image sensor for the subject image at a plurality of different moments in time for a rolling frame, and wherein the processing circuitry is configured to utilize image data from a given portion of the image sensor at a plurality of different moments in time to create a respective portion of a desired frame to be outputted and corresponding to the subject image; and
    wherein the processing circuitry is configured to create an entirety of the desired frame comprising image data for a respective single moment in time.

11. The device of claim 10, wherein the processing circuitry is configured to implement an electronic rolling shutter to read the image data from the different portions of the image sensor.

12. The device of claim 10, wherein the processing circuitry is configured to utilize image data from remaining portions of the image sensor at different moments in time to create respective individual remaining portions of the desired frame to be outputted.

13. The device of claim 10, wherein the processing circuitry is configured to interpolate the image data read at the different moments in time to create the respective portion of the desired frame.

14. The device of claim 10, wherein the respective portion of the desired frame corresponds to a given moment in time, and the processing circuitry is configured to interpolate image data obtained from the given portion of the image sensor at moments in time immediately adjacent to the given moment in time to create the respective portion of the desired frame.

15. The device of claim 10, wherein the processing circuitry is configured to obtain motion data intermediate the different moments in time, and to use the motion data to create the respective portion of the desired frame.

16. The device of claim 10, wherein the processing circuitry is configured to control resetting of the different portions of the image sensor after the image data from the respective portions is read.

17. The device of claim 16, wherein the processing circuitry is configured to delay the resetting of the different portions to avoid overexposure.

18. The device of claim 10, wherein the rolling frame comprises an initial rolling frame, and the desired frame comprises an initial desired frame, and the image sensor is configured to generate the digital video image data of a video comprising the initial rolling frame and a plurality of additional rolling frames, and the processing circuitry is configured to utilize image data of all of the rolling frames of the video to generate the initial desired frame and a plurality of additional desired frames.

19. The device of claim 10, wherein the processing circuitry is configured to utilize a weighted average of the image data from the given portion of the image sensor at the different moments in time to create the respective portion of the desired frame.

20. A digital video imaging device comprising:
- image sensing means for providing digital video image data responsive to received light of a subject image, wherein the sensing means comprises means for providing image data of a plurality of portions of the subject image; and
- processing means for reading the image data of the portions of the sensing means at a plurality of different moments in time, for translating the image data of the portions of the sensing means to a common moment in time, and for outputting a desired frame comprising the translated image data after the translating.

21. The device of claim 20, wherein the image sensing means and the processing means comprise means for implementing electronic rolling shutter operations for providing the digital video image data.

22. The device of claim 20, wherein the outputting the desired frame comprises outputting the desired frame corresponding to the common moment in time, and wherein the processing means comprises means for reading the image data for a plurality of rolling frames, and the translating comprises, for an individual portion of the desired frame, using image data of the respective portion of the sensing means from a plurality of the rolling frames.

23. The device of claim 22, wherein the translating comprises translating using the image data from the plurality of rolling frames immediately adjacent to the common moment in time.

24. The device of claim 23, wherein the translating comprises interpolating the image data of the rolling frames.

25. The device of claim 20, further comprising determining motion data intermediate a plurality of rolling frames and the translating comprises translating using the motion data.

26. The device of claim 20, wherein the processing means comprises means for resetting portions of the image sensing means after reading image data from the respective portions.

27. The device of claim 26, wherein the processing means comprises means for delaying the resetting to avoid overexposure.

28. An article of manufacture comprising:
- a processor-usable medium comprising processor-usable code configured to cause processing circuitry to perform processing comprising:
- accessing image data of a plurality of rolling frames, wherein individual rolling frames comprise image data accessed at a plurality of moments in time;
- defining a common moment in time corresponding to a desired frame to be generated;
- translating image data from a plurality of the rolling frames obtained at different moments in time to the common moment in time; and
- outputting the desired frame comprising the translated image data.

29. The article of claim 28, wherein the processor-usable code is configured to cause the processing circuitry to access the image data for a given rolling frame in a plurality of portions at the plurality of moments in time.

30. The article of claim 28, wherein the processor-usable code is configured to cause the processing circuitry to operate as electronic rolling shutter in conjunction with an image sensor.

31. The article of claim 28, wherein the processor-usable code is configured to cause the processing circuitry to interpolate the image data of the rolling frames to provide the translated image data.

32. The article of claim 28, wherein the processor-usable code is configured to cause the processing circuitry to interpolate the image data of the rolling frames comprising the rolling frames immediately adjacent to the common moment in time.

33. The article of claim 28, wherein the processor-usable code is configured to cause the processing circuitry to determine motion data intermediate the rolling frames, and to translate the image data using the motion data.

34. The article of claim 28, wherein the processor-usable code is configured to cause the processing circuitry to count a delay period at the plurality of moments in time after accessing the image data of individual ones of the rolling frames, and to reset respective portions of an image sensor after the countings of the delay period.

35. The device of claim 20, wherein the processing means comprises means for providing the desired frame comprising the translated image data corresponding to the common moment in time comprising a single moment in time.

36. The device of claim 20, wherein the image sensing means comprises means for providing the digital video image data of a video comprising a plurality of rolling frames, wherein the desired frame comprises an initial desired frame, and wherein the processing means comprises means for using image data of all of the rolling frames of the video to generate the initial desired frame and a plurality of additional desired frames.

37. The article of claim 28, wherein the image data of the desired frame corresponds to the common moment in time comprising a single moment in time.

38. The article of claim 28, wherein the desired frame comprises an initial desired frame and the processor-usable medium comprises processor-usable code configured to cause the processing circuitry to use image data of all of the rolling frames of the video to generate the initial desired frame and a plurality of additional desired frames.

39. The article of claim 28, wherein the processor-usable medium comprises a computer readable medium having encoded thereon a computer program comprising the processor-usable code comprising a set of instructions when executed by the processing circuitry of a computer cause the computer to perform the accessing, the defining, the translating and the outputting.

* * * * *